Sept. 3, 1963 W. J. LEATHER 3,102,438
TWO-SPEED GEARBOX
Filed July 30, 1962 2 Sheets-Sheet 1

FIG. I

INVENTOR
WILLIAM J. LEATHER
BY: Featherstonhaugh & Co
ATTORNEYS

Sept. 3, 1963　　　　　W. J. LEATHER　　　　　3,102,438
TWO-SPEED GEARBOX

Filed July 30, 1962　　　　　　　　　　　　　2 Sheets-Sheet 2

INVENTOR
WILLIAM J. LEATHER
BY: *Fetherstonhaugh & Co*
ATTORNEYS

United States Patent Office 3,102,438
Patented Sept. 3, 1963

3,102,438
TWO-SPEED GEARBOX
William J. Leather, 549 Brookdale Ave.,
Toronto 12, Ontario, Canada
Filed July 30, 1962, Ser. No. 213,383
5 Claims. (Cl. 74—764)

This invention relates to speed reducers, and is particularly concerned with a mechanism capable of transposing the speed of an input shaft to two different speeds of an output shaft.

The speed reducing mechanism in accord with the invention is particularly adapted to use in situations requiring an optional selection between power and manual operation. In such situations, there must be provided some method whereby two different values of mechanical advantage can be selected, i.e., it must be possible to obtain a very much higher mechanical advantage for the manual operation than for the power operation.

As an example of the above referred to situation, reference is made to the operation of large valves in pipe lines and the like. These valves are normally power operated and controlled remotely. However, there are times when it is necessary to dispense with the power operation and to operate the valves manually. The device in accord with the present invention is particularly suited to such an application, since it is cable of delivering two output shaft speeds of highly different value for the same input shaft speed. In effect, this means that two highly different degrees of mechanical advantage can be obtained.

The device in accord with the invention is also provided with means for protecting against overload.

It is believed the invention will be more readily understood from the following specification as read in conjunction with the drawings.

Figure 1:
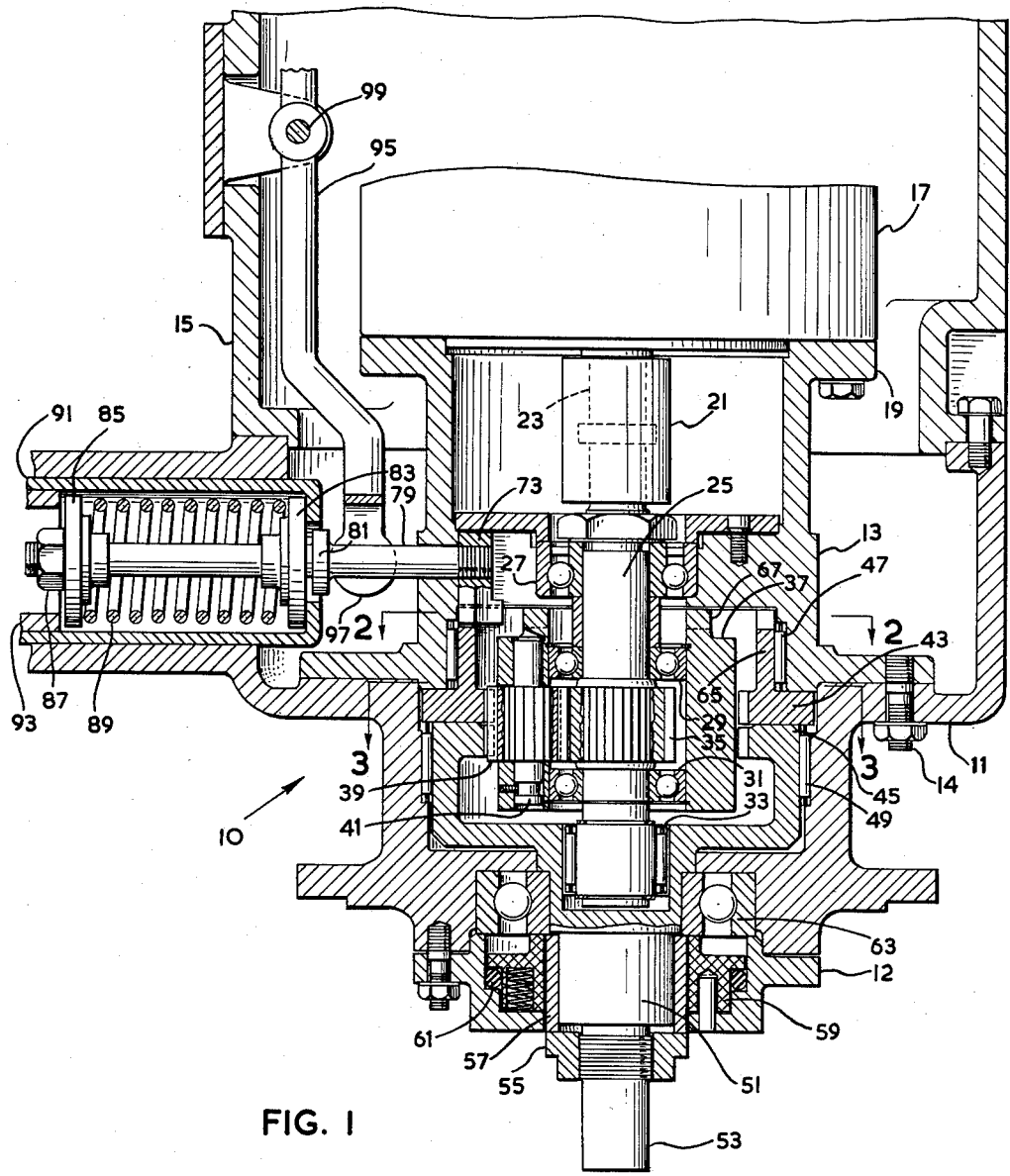
FIGURE 1 is a cross sectional view through a speed reducer in accord with the invention.

Referring to FIGURE 1, the speed reducing mechanism in accord with this invention is enclosed within a casing, generally indicated by the numeral 10. Casing 10 is actually made of several components which can be cast of aluminum or steel as is the usual practice for this type of apparatus. The main component is an outer casing 11 having an end cap 12. An inner casing 13 is fixed to the outer casing 11 by nut and bolt assemblies such as unit 14. Attached to casing 12 is a further casing 15 enclosing an electric motor 17. The latter is bolted to flange 19 of inner casing 13. A muff coupling 21 connects the motor shaft 23 with the input shaft 25 of the speed reducer.

Input shaft 25 is supported for rotation by a plurality of bearing members consisting of ballbearing units 27, 29, 31 and roller bearing 33.

Shaft 25 carries a fixed sun gear 35 which may be integral with the shaft or a separate unit keyed to the shaft. Attached to the outer races of ballbearing units 29 and 31 there is an annular planet gear carrier 37. At one point on its circumference, the planet gear carrier carries a planet gear 39 supported on a shaft 41 which extends generally parallel to input shaft 25. Planet gear 39 is meshed with sun gear 35 and is free to be driven thereby.

Mounted concentrically about shaft 25 are a pair of annular gears 43 and 45. Gear 43 is mounted for rotation within the roller bearing 47, gear 45 being mounted for rotation within a similar roller bearing 49. The teeth of these gears are formed on their inside surfaces and are meshed with the planet gear 39.

Annular gear 45 is extended longitudinally of shaft 25 and terminates in a coupling member 51, to which is attached the output shaft 53. The free end of the output shaft is received in coupling 51 and is threaded near this end to the collar 57 which is press fitted to the outside of coupling 51. The outside surface of collar 57 rotates within a fixed bearing 59 appropriately sealed by an O ring 61. The extension of annular gear 45 which eventually terminates in coupling member 51 is mounted for rotation within ballbearing unit 63 and on the roller bearing unit 33.

The specific details of the mounting of the annular gear 45 and output shaft 53 are not critical to the invention, it being important only to understand that the rotation of annular gear 45 rotates output shaft 53.

As will be explained in more detail below, annular gear 45 has one less tooth than annular gear 43, although both gears are cut on the same pitch circle diameter.

Figure 2:
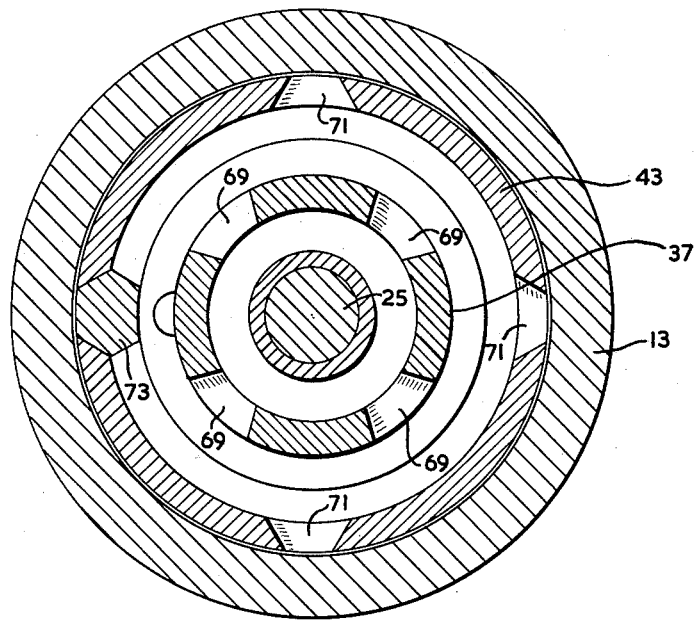
FIGURE 2 is a transverse cross section taken along the line 2—2 of FIGURE 1.
Figure 3:
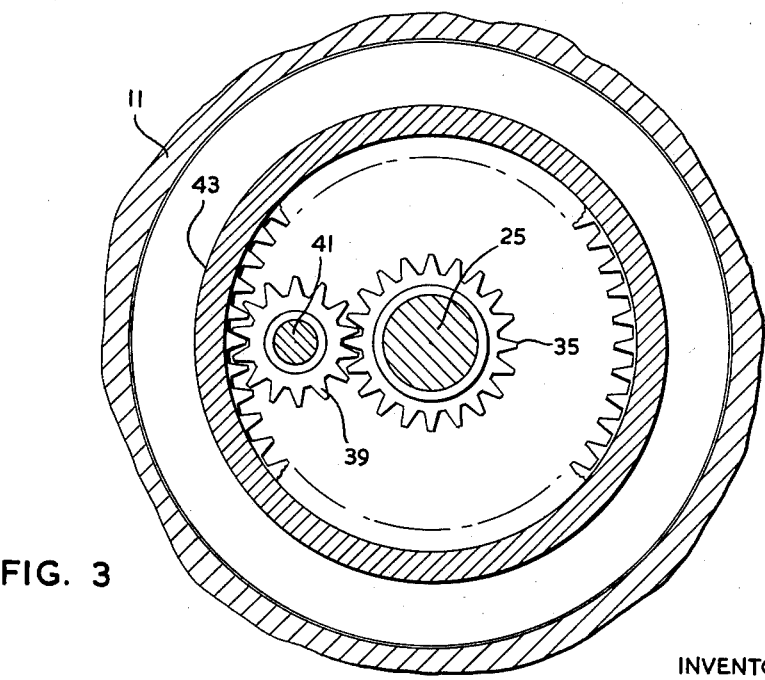
FIGURE 3 is a transverse cross section taken along the line 3—3 of FIGURE 1.

Annular gear 43 carries an integral annular flange 65 which actually constitutes a sleeve co-axially mounted about input shaft 25 and is supported for rotation by the roller bearings 47, previously described. Planet carrier 37 also carries an integral annular flange 67 which also is coaxially mounted about shaft 25 whereby flanges 67 and 65 form an annular chamber of a sort therebetween. As might best be appreciated from FIGURE 2, both flanges 65 and 67 are provided with recesses 69 and 71 respectively. The side margins of these recesses are sloped as shown in FIGURE 2. There is also provided a latch member 73 which is shaped to mate with both recesses 69 and 71. Latch member 73 may be reciprocated from either side of the annular chamber formed between flanges 65 and 67 to engagement in one of the recesses 69 or one of the recesses 71. Engagement with one of the recesses 69 serves to prevent the rotation of the gear carrier 37 while engagement with one of the slots 71 prevents the rotation of the annular gear 43.

It will be appreciated that when the latch 73 is engaged in one of the recesses 69, whereby to prevent the rotation of the planet gear carrier 37, there will be a straight line connection between input shaft 25 and output shaft 53. With planet gear carrier 37 prevented from rotation, sun gear 35 will cause the direct rotation of planet gear 39 which, in turn, will drive annular gear 45 and output shaft 53. At the same time, annular gear 37 is free to rotate and does not effect the direct line drive between the input and output shaft.

On the other hand, when latch member 73 is engaged in one of the recesses 71 in annular gear 43, the latter is prevented from rotation whereas the planet gear carrier 37 is free to rotate about shaft 25. As shaft 25 and hence sun gear 35 rotate, the meshing of the sun gear with the planet gear and the meshing of the planet gear with the annular gear 37 causes the planet gear to rotate about shaft 25. Since annular gear 45 is also meshed with planet gear 39, but has one less tooth than the other annular gear 43, it will move around its axis by one complete pitch for one rotation of the planet gear 39 about the sun gear. In this regard, it will be appreciated that gear 45 could also have one more rather than one less tooth than gear 37 with the result that the rotation of gear 45 and output shaft would be reversed.

The two speeds of the output shaft are achieved by preventing the rotation of the planet gear carrier on the one hand, and the rotation of the first annular gear 37 on the other hand. The speeds produced are predictable in accord with the equations set out below.

For the straight through drive achieved by preventing the rotation of gear carrier 37, the ratio of the speed of the input shaft to the speed of the output shaft is as follows:

$$\frac{\text{Input shaft speed}}{\text{Output shaft speed}} = \frac{\text{No. of teeth on annular gear 45}}{\text{No. of teeth on planet gear 39}}$$

For the high speed reduction achieved by preventing the rotation of the first annular gear 43 the ratio of the input speed to the output speed is as follows:

$$\frac{\text{Input shaft speed}}{\text{Output shaft speed}} = \frac{\text{No. of teeth on annular gear 45} \times \text{No. of teeth on annular gear 43}}{\text{No. of teeth on planet gear 39}}$$

It will be appreciated that the difference between the two ratios given above is considerable, so that the apparatus is particularly useful for conversion from power to manual operation. It is thus possible to operate a large valve such as might be found on an oil pipe line, which valve would normally be capable of power operation only. But it is equally important that the speed reducer in accord with the invention is compact and relatively inexpensive compared with the equivalent devices hitherto available.

The present device is also provided with an overload relief mechanism. As mentioned above, the relatively high ratio of input speed to output speed is achieved by preventing the rotation of annular gear 43 through the operation of the latch member 73. The latter is shifted into engagement with one of the recesses 71 in annular gear 43. Since this latter gear is thus fixed in position, it will be subjected to a torque equal in magnitude to the torque on the output shaft 53. As soon as this torque exceeds a predetermined value, the latch member 73 will slide out of the engaged recesses 71 due to the sloped side margins of both the latch member and the recess, thereby freeing gear 43 for rotation. The output shaft 43 will then cease to rotate and annular gear 43 will rotate until latch member 73 is once again engaged in one of the recesses 71. When this reengagement takes place and the torque is still greater than the designed torque, slippage will continue until the torque is again reduced to or below the designed value.

The same action takes place when the relatively low speed ratio between the input shaft and the output shaft is being used. In this case, however, the latch member 73 is in engagement with one of the recesses 69 in the planet gear carrier 37.

This shifting of the latch member 73 takes place automatically due to the construction of the overload mechanism now to be described. This mechanism includes a spindle 79, having the latch member 73 carried at its free end. Spindle 79 is also provided with an integral collar 81, two free collars 83 and 85, and a nut 87, threaded on the end opposite to latch 73. Free collars 83 and 85 are capable of sliding back and forth on spindle 79. Resting between collars 83 and 85 there is a coil spring 89. The left hand end of spindle 79 (as seen in FIGURE 1) is enclosed within a sleeve 91 which is apertured at its inside end whereby to permit the passage of collar 81. A second sleeve 93 is placed in the opposite end of outer sleeve 91 and serves as a stop member against which collar 85 abuts.

When the torque exerted on annular gear 43 exceeds a predetermined maximum value, latch member 73 will be urged out of engagement with recess 71. However, in order for this dis-engagement to take place, spring 89 must be compressed. Thus, the spindle 79 is shifted to the right (as seen in FIGURE 1). Nut 87 forces collar 85 against spring 89, it being understood that the free mounting of collar 83 permits this shifting of spindle 79.

The strength of spring 89 may be adjusted by shifting nut 87 along the spindle. It is by this means that the desired maximum torque to be exerted upon annular gear 43 can be selected.

In the case wherein the low speed reduction ratio is selected by engaging latch member 73 in one of the recesses 69 in the planet gear carrier 37, such engagement is effected by shifting sleeves 91 and 93 to the right (as seen in FIGURE 1) thereby shifting the whole latch and spindle mechanism. The overload relief sequence in this case is identical to that previously described, except that it takes place in the opposite direction. Thus, when the torque exerted on the planet gear carrier 37 exceeds the predetermined maximum value, latch member 73 is urged out of recess 69 thereby causing spindle 79 to shift to the left. As a result, integral collar 81 abuts against collar 83 which is thus forced to the left against the compression of spring 89.

It will be appreciated from the above description that the selection of either the high or low speed reduction is achieved by shifting sleeves 91 and 93 to the right or left whereby to move latch member 73 into engagement in either of the recesses 69 or 71. This shifting of sleeves 91 and 93 can be achieved by any suitable mechanism which can be remotely controlled if so desired. In the case wherein such remote control is employed, it is necessary to provide some mechanism whereby the operator may manually select the high speed reduction ratio at the site. In the illustrated embodiment of the invention, such manual selection is gained by use of the lever mechanism 95 which is forked at its lower end as to spread eagle spindle 79. This end of lever 95 is also provided with a bulbous shoulder 97 whereby to more effectively engage collar 81. Lever 95 is pivoted at 99 so that spindle 79 may be shifted to the left when the upper end of lever 95 is pushed to the right (as seen in FIGURE 1). If desired, the operation of lever 95 could also be used to trip a switch to cut off the power supply to the motor 17 and could also be used to bring into operation a hand wheel whereby to manually rotate the motor shaft and input shaft 25.

In summary, the speed reducer in accord with this invention is capable of reducing an input shaft speed to one of two highly different output shaft speeds, it is capable of manual operation, has built in overload relief features and it is compact and inexpensive as compared with the devices hitherto available.

What I claim as my invention is:

1. A speed reducer comprising a casing, an input shaft, an output shaft, gear mechanisms within said casing for transposing the speed of rotation of said input shaft to two different speeds of rotation of said output shaft and selector means for selecting either one of said output shaft speeds, said gear mechanisms including a sun gear coaxially fixed to said input shaft, a planet gear carrier mounted coaxially on said input shaft and free to rotate thereabout, said carrier carrying a planet gear mounted on a secondary shaft extending parallel to said input shaft with said planet gear being meshed with said sun gear, a first annular gear mounted coaxially about said input shaft and free to rotate thereabout, said first annular gear being toothed on its inner surface and meshed with said planet gear, a second annular gear also mounted coaxially of said input shaft and free to rotate thereabout, said second annular gear also being toothed on its inside surface and meshed with said planet gear, said second annular gear being cut on the same pitch circle as said first annular gear but having a different number of teeth, said output shaft being aligned with said input shaft and connected to said second annular gear and means for selectively stopping the rotation of said planet gear carrier on the one hand and the rotation of said first annular gear on the other hand whereby said output shaft is caused to rotate at two different speeds for the same speed of rotation of said input shaft.

2. A speed reducer as claimed in claim 1, in which said means for selectively stopping the rotation of said planet gear carrier and said first annular gear comprises an annular shoulder on said first annular gear, an annular shoulder on said planet gear carrier, said shoulders being spaced in the direction taken transverse to said input shaft as to define an annular chamber therebetween, said shoulders each having at least one recess facing said annular chamber, selector latch means mounted for reciprocation across said chamber to engage in said recesses as they become aligned therewith, and means for reciprocating said selector latch means to engage in either said planet gear carrier recess or said first annular gear recess whereby to gain a low or high speed reduction respectively.

3. A speed reducer as claimed in claim 2, in which said means for reciprocating said selector latch means comprises a spindle carrying said latch means at one end thereof, spindle mounting means in which the other end of said spindle is engaged, and means for moving said spindle mounting means towards and away from said input shaft.

4. A speed reducer as claimed in claim 3 in which said means for moving said spindle includes a lever mechanism adapted for manual operation whereby said latch means may be moved into engagement with one of the recesses in said first annular gear to select a high speed reduction.

5. A speed reducer as claimed in claim 3 including an overload relief mechanism associated with said latch means carrying spindle, said overload relief mechanism comprising a first member fixed to said spindle, a collar adjacent said first stop member and free to slide on said spindle, a second stop member spaced from said first stop member along the length of said spindle, a second collar adjacent said second stop member and being free to slide along said spindle and a coil spring wrapped about said spindle between and abutting against said collars, a first sleeve member coaxially mounted about said spindle and having an internal annular shoulder against which the outside peripheral edge of said first collar abuts, and a second sleeve within said first sleeve and abutting against the outside peripheral edge of said second collar, said first and second sleeves being adjustable towards and away from said input shaft whereby movement of said sleeves shifts said latch lever into alternate engagement in said first annular gear and said planet gear carrier recesses, said recesses being bevelled along their side edges, said latch means also being bevelled on its side edges whereby a torque exerted on either said planet gear carrier or said first annular gear and exceeding a predetermined design torque will cause said latch means to slip out of said recesses against the bias of said spring.

No references cited.